United States Patent Office 3,147,117
Patented Sept. 1, 1964

3,147,117
PROCESS OF FORMING PRINT-OUT IMAGES FROM LIGHT SENSITIVE ORGANIC AMINE COMPOSITIONS
Eugene Wainer, Shaker Heights, and Richard A. Fotland, Maple Heights, Ohio, assignors to Horizons Incorporated, a corporation of New Jersey
No Drawing. Filed May 26, 1961, Ser. No. 118,487
16 Claims. (Cl. 96—48)

This invention relates to compositions of matter which respond, photographically speaking, on exposure to various forms of radiant energy including not only the ultraviolet and visible regions of the electromagnetic spectrum, but also X-radiation gamma rays, electron beams as developed by cathode ray guns, beta rays, condensed spark discharges as herein defined and other forms of corpuscular energy.

More particularly, the invention relates to compositions of matter suitable for the recording of information provided by electromagnetic and corpuscular energy which compositions comprise mixtures containing the following:

(a) Organic amines
(b) Combinations of suitable organic halogen compounds, and
(c) Halogen compounds of specified metals suitably disposed in or on a carrying base material such as a film-forming plastic, and accompanied by any of a variety of additional constituents whose presence enhances some specific property of the composition or of the processing of the composition.

(1) THE PRIOR ART

In earlier applications including U.S. Serial No. 787,-112, filed January 16, 1959, by Eugene Wainer, which issued as U.S. Patent 3,042,515 on July 3, 1962, and in other applications disclosing specific improvements on the photographic systems described in said Wainer application, a variety of chemical systems suitable for photographic purposes are described, which, when suitably utilized, will respond to the electromagnetic spectrum from the ultraviolet i.e. wavelengths as low as about 2500 Angstrom units up to red region of the visible spectrum i.e. wavelengths up to about 7000 Angstrom units, and sometimes even into the infrared region. In general the chemical systems described in the aforesaid applications comprise combinations of organic amines and organic halogen compounds suitably disposed on or in a compatible base or support material. These compositions are readily obtained as dry stable films in which a photographic image becomes available immediately on exposure to radiation of specified wavelength or on exposure followed by heating for developing and fixing the image.

As indicated above, the compositions described in the aforesaid Wainer applications comprise the following:
(1) Organic amines, and
(2) Organic halogen-containing compounds dispersed in or disposed on a suitable carrying base, with or without the addition of other agents to control side effects involving stability of the material prior to exposure, stability of the image after exposure, protection of the composition against exposure to undesired radiation, fixing, speed and intensity of response to exposure and other commonly desired objectives in a photographic film.

The organic amines described in Wainer's United States Patents 3,042,515–519 inclusive fall into two groups as follows: (a) arylamines in which the amine nitrogen is attached to an aromatic nucleus and (b) amines containing a vinyl grouping in their structure in which the vinyl grouping is attached directly to the amine nitrogen.

In these compositions, the arylamines suitable for the process are represented by the general formula

wherein R represents an aromatic nucleus and X and Y are each selected from the group consisting of hydrogen; halogen other than fluorine, i.e. chlorine, bromine or iodine; alkyl; substituted alkyl; aryl, and substituted aryl.

Suitable amines, specified by way of example, include diphenylamine; the leuco bases of crystal violet and malachite green and similar colorless dye bases; N-vinylcarbazole and other N-vinyl compounds; styryl quinoline dye bases, cyanine dye bases and other arylamines of the same general formulae.

In these compositions, the organic halogen-containing compounds suitable as initiators of the chemical reaction which occurs on exposure to light in the processes described, are those materials whose bond dissociation energy is in the range of 40 to 80 kilogram calories per mole. Preferably the organic halogen compounds are those wherein a single carbon atom has at least 3 halogens attached thereto, e.g. compounds represented by the general formula $$A\text{—}C\text{—}X_3$$

wherein A represents a monovalent radical selected from the group consisting of hydrogen; halogen other than fluorine, i.e. chlorine, bromine or iodine; alkyl; substituted alkyl and particularly haloalkyl; aryl, particularly phenyl or naphthyl; and substituted aryl; and each X is a halogen selected from the group consisting of chlorine, bromine and iodine and the X's may differ from one another.

Organic halogen-containing compounds indicated as suitable in the aforesaid inventions included:

Carbon tetrabromide, $CBr_4$;
Hexabromethane, $C_2Br_6$;
Pentabromethane, $HC_2Br_5$;
Hexachlorethane, $C_2Cl_6$;
Iodoform, $HCI_3$;
Tetrachlortetrahydronaphthalene, $C_{10}H_8$ - 1,2,3,4 - $Cl_4$ and other halogen-substituted aryl compounds and others of a similar nature coming within the terms of the description above.

A wide variety of materials are disclosed as suitable bases or supports on which or in which the mixture of arylamine and halogen-containing organic compound may be disposed or dispersed include film-formers such as polyvinyl chloride, polyvinylidene chloride, polystyrene, polyvinyl acetate, polymethylmethacrylate and other similar polymers of vinylidene and vinyl monomers, as well as cellulose derivatives such as ethylcellulose, cellulose acetate, cellulose nitrate and the like. The active ingredients, mixed with dopes based on such plastic materials may, as described in the foregoing applications, be produced as free films, or as deposits on substrates such as glass, paper, cloth, or inert plastic films, e.g. the active material may be produced simply by dipping a supoprting material in a solution of the reactive materials.

As has been indicated above, other ingredients may be added to improve stability, fixing, sensitivity or for other specific purposes.

One distinguishing characteristic of the dry print-out compositions described above is both the starting color and the finish color. In the case of those materials whose primary sensitivity is in the ultraviolet, the starting color is effectively colorless or at most a faint pale tan or yellow overtone. Materials which are sensitive in the visible particularly above 4000 A. and up to the red end of the visible spectrum generally exhibit a considerable amount of color and as a result of exposure to light, this color is transformed into a different color. Any visible color can be produced depending on the nature of the amine which is utilized in the original mixture. By use of suitable mixtures, a full color rendition can be achieved if the systems are properly manipulated. In addition, suitable mixtures of colors may produce a black or neutral gray image if desired and this may be accomplished both in the ultraviolet sensitive system and in the systems sensitive to visible light. Certain of these systems will produce blacks or neutral grays directly from a single component.

By far the most important feature of the various systems which has been previously described in the aforementioned specifications is the rather sharp peaks of spectral sensitivity available from a particular theoretical free radical producer. For example, a combination of diphenylamine and carbon tetrabromide exhibits a peak of sensitivity at approximately 3900 A. and such sensitivity disappears almost entirely if the incident radiation has a wavelength in the region of 4000 to 4100 A. Also, a short wavelength cutoff is found so that the system has very little or no sensitivity if the wavelength of the incident radiation is below 3300 to 3500 A. This is true of all of the various systems and one of the major means for obtaining a blanket coverage throughout a spectral range is to utilize mixtures of particular organic halogenating agents whose bond dissociation energies are such that they blanket the desired spectral range of response.

One limitation which appears to follow logically from the sensitivity described above is an insensitivity to radiation outside of the ranges described. Thus, even when exposed to relatively enormous amounts of X-radiation, including gamma rays, electron beam radiation, and similar forms of energy, it was found that the systems had little or no sensitivity and that where any sensitivity was detectable it was usually imparted to the system by the base material rather than by the arylamine or organic halogen-containing compound. Various approaches were tried to improve the sensitivity of the systems, including the addition thereto of substantial amounts of metal oxides such as lead oxide and tin oxides, but although a slight increase in sensitivity was noted, it was so minute as to be of academic interest and of no commercial importance, and even when large amounts of radiation were employed, the response was not sufficient for practical purposes.

(2) THE PRESENT INVENTION

Briefly the present invention resides in the addition of certain halogen compounds or halogenate compounds of various heavy metals to the systems described above, whereby the previous insensitive systems were found to possess an enhanced sensitivity to high energy type of radiations such as X-radiation, including gamma rays, electron beams as developed by cathode ray guns; beta rays; condensed spark discharges and the like. While a large number of halogen compounds were found to profoundly accelerate the chemical reaction in the systems, those preferred for the purposes of the present invention comprise the iodides, iodates, bromides, and bromates of certain heavy metals, hereinafter identified.

While we do not wish to be bound by any specific theoretical explanation, it is believed to be significant that the heavy metal halogen compounds themselves do not appear to be sources of the free radicals which produce the colored reaction products by interaction on the amines. This was demonstrated by exposure of films comprising mixtures of organic amines, heavy metal halogen compounds, and plastic carriers. Such compositions were found to be substantially insensitive when the organic halogen compound was omitted from the mixtures and it was not until an organic halogen compound was added to the otherwise identical mixture that sensitivities several orders of magnitude higher than those obtained in its absence, were obtained. Thus, while sensitivity of the system could be increased somewhat by omitting the organic halogen compounds and by increasing the amount of heavy metal halogen compound to such an extent that it comprises a major portion of the photosensitive mixture, the degree of sensitivity which could be obtained in this manner was insignificant in comparison with that obtainable by the use of mixtures with even a small amount of the organic halogen material and the heavy metal compound.

It is thus a primary object of this invention to provide a novel combination of chemicals which in thin sheet or film form will record photographically X-ray radiation, gamma rays; electron beam radiation as developed by a cathode ray tube and beta rays; condensed smothered spark information; and similar high energy electromagnetic or corpuscular radiation.

It is a further object of the invention to provide suitable compositions as opaque or transparent film which print out directly on exposure to such radiation or which are capable of being printed out by entirely dry processes such as a comibnation of exposure to high energy radiation followed by heating.

A further object of this invention is to provide means to make the recorded results of such radiation immediately available in visible form so that the results of exposure to specific types of radiation may be observed substantially instantaneously after exposure of the radiation sensitive composition.

It is a further object of the invention to provide compositions and photosystems useful for indicating dosimetry of X-ray radiation and nuclear radiation to which they have been exposed.

Still a further object of the invention is to provide a radiation responsive medium capable of receiving information and data for recording thereon e.g. information supplied by an electron beam system, at high rates of input speed and with a high resolution, which recordings may be read from said medium visually.

It is still a further object of this invention to provide a record receiving medium for use in radar recording and which may be read immediately after the reception thereon of radiation of the type described.

Still another object of the invention is to provide a radiation sensitive record medium suitable for use in data processing and data storage and retrieval systems.

It is still a further object of the invention to provide a record receiver for use in photographic systems and which may be read by electron beam flying spot scanning devices immediately after writing thereon.

These and other objects of the invention, which will be specifically pointed out or will be otherwise apparent from the description which follows, are achieved through the use of novel compositions of matter which are exceptionally sensitive to high energy radiations of the types previously enumerated, which compositions comprise combinations of the following:

(a) Arylamines,
(b) Free radical producing organic halogen compounds,
(c) Heavy metal halogen-containing compounds, and
(d) Suitable carrier or supporting materials in which the above are dispersed or on which the above are deposited.

Preferably, in practicing the invention, it is preferred to use systems whose sensitivity to visible light is relatively low or even entirely absent, to facilitate the preparation and utilization of the photosensitive media.

With this requirement in view, the N-vinylamines and the types of arylamines represented by the general formula

wherein R is an aromatic nucleus and X and Y are each selected from the group consisting of hydrogen; halogen other than fluorine, i.e. chlorine, bromine or iodine; alkyl; substituted alkyl; aryl, and substituted aryl, which have been found to be most suitable for the present purposes are diphenylamine and N-vinylcarbazole and combinations of such amines whose visible light sensitivity does not extend to radiation having wavelengths above 4000 A. when utilized with the preferred free radical sources.

The organic halogen-containing free radical sources preferred in the practice of the present invention, selected from free radical sources described in the aforementioned Wainer applications and having a single carbon atom joined to three or more halogen atoms, and being one whose bond dissociation energy is between 40 and 80 kilogram calories per mole, comprise the following:

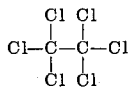

Hexachlorethane

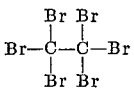

Hexabromethane

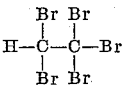

Pentabromethane

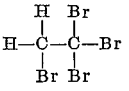

Tetrabromethane

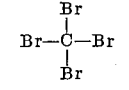

Carbon Tetrabromide

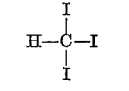

Iodoform

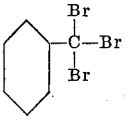

Benzyltribromide

When exposure is to be effected in a vacuum the comparatively less volatile organic compounds such as $C_2Cl_6$, $C_2Br_6$, and $HC_2Br_5$ are preferred over the more volatile of the foregoing compounds.

The carriers or supporting materials within which the arylamines and free radical sources are dispersed are selected preferably from polymers of vinylidene monomers (including vinyls) or cellulose derivatives. Typical exemplary carriers include polystyrene, polyvinyl chloride, polyvinylacetate, polymethylmethacrylate, polyvinylidene chloride, ethylcellulose, cellulose acetate and cellulose nitrate. In preparing the radiation sensitive compositions in film form, the foregoing, or equivalent materials, are dissolved in a mixture of solvents such as acetone, and other ketones; methyl alcohol, ethyl alcohol or other alcohols; toluene, xylene or other aromatic hydrocarbons; tetrahydrofuran; ethyl acetate, trichlorethylene, ethylene dichloride, mixtures of the foregoing or any other compatible solvents known in the art for the carriers selected. Generally the carrier is made up in the form of a 10% to 20% solution, by weight.

To impart sensitivity to high energy radiation to the compositions of this invention, the iodides, iodates, bromides or bromates of certain heavy metals are added to the compositions; in addition, the addition must be made in a manner which is compatible with the remaining constituents.

We have found that in order to utilize the heavy metal compounds to the fullest extent, they should be soluble in organic solvents and compatible with the polymer or resin system in which or on which the composition is disposed. To this end it has been found desirable to complex the heavy metal halogen compound in any of several ways. One relatively direct mode of complexing is to add hydriodic acid or salts of hydriodic acid such as KI to the system. Thus, compounds such as the iodides, iodates, bromides and bromates of lead and the compound mercuric iodate, each of which exhibits only a very limited solubility, experience a greatly increased solubility when potassium iodide or hydriodic acid is added to the organic solvent. Another expedient has been to bring the heavy metal compound which is only sparingly soluble in the organic solvent, into contact with the amine and added iodide, at room temperature, whereupon a complex appears to form, as evidenced by a discharge of any residual color in the solution. Still another expedient which has been successfully employed has been the use of mixtures of several heavy-metal compounds in place of a single such compound. A further procedure is to produce a metallo-organic derivative which still retains the desired sensitizing characteristics of the simpler compound but at the same time shows a much higher degree of compatibility or solubility than exhibited by the simple heavy metal compound. Illustrative of this procedure are dibenzyl tin diiodide; ethyl mercuric iodide; phenyl mercuric iodide, triphenyl lead bromide and the like.

The heavy metal halides and halogenates which are suitable for the purposes of the present invention are the iodides, iodates, bromides and bromates of the metal cadmium, tin, antimony, mercury, lead, bismuth and uranium (uranyl), which metals, except for uranium are found to fall in the fifth and sixth horizontal periods of the Periodic Table. Further it has been found that for cadmium, tin and antimony, the iodides or iodates are particularly preferred, while for the remaining metals, both the iodine or bromine compounds are particularly useful.

It is preferred that heavy metal compounds of the group indicated should be relatively soluble in organic media compatible with the other constituents of the system. Preferably the compatibility should be so complete that after the solvents have been evaporated, the heavy metal compound does not precipitate in a manner so as to yield opacity, although such opacity may be tolerated provided the precipitation is colloidal in nature. In addition, preferred heavy metal compounds of the above group are those which produce a substantially colorless film, or one which is only faintly colored.

The metals of the heavy metal halogen compound all exhibit a plurality of valances and are readily transformed from one valence to another by relatively mild reactions, including even the reduction from other valence states to the metal itself.

Finally, it has been found that the heavy metal compounds indicated above possess the very important stability in the presence of the other ingredients of the system so that premature fogging or precipitation do not take place prior to exposure and loss of sensitivity does not occur for similar reasons.

In preparing the radiation sensitive compositions from which the films or coatings of the present invention are made, the usual procedure is to dissolve the resin or other carrier in a suitable mixture of solvents and to then add the arylamine and the organic halogen free radical sources. Thereafter, the inorganic or metallo-organic halogen compound, dissolved in a suitable solvent is added to the completely organic portion of the system in solution form, utilizing the special techniques described above, if necessary, to enhance the solubility of the heavy metal compound. Thereafter, free films may be produced by casting such solutions on glass and drying the film and stripping the film so produced.

Alternatively similar compositions are prepared except that the relative amount of resin is considerably diminished below that utilized for casting on glass, and the modified compositions are coated on other substrates such as plastic film, paper or cloth. The same modified compositions may be used as a coating bath into which clear plastic film, or paper or cloth or other absorbent medium may be dipped to yield a sensitive surface.

Table 1, below, sets forth proportions which are preferred, all parts being by weight, the heavy metal containing halogen compound being preferably added as a 10% solution in its own solvent which may include KI or HI or other complexing agent.

TABLE 1.—RANGES OF INGREDIENTS OF RAW BATCH

A. Free films or films on glass or impervious plastic:

| | |
|---|---|
| Solvent for resin system | 500 to 1000 |
| Resin | 100 |
| Arylamine | 10 to 100 |
| Organic halogen compound | 0.5 to 50 |
| Inorganic halogen compound or inorganic halogenate compound or metallo-organic halide compound | [1] 1.0 to 50 |

[1] As 10% solution in own solvent. Figures given are dry weights.

B. Composition for paper or cloth substrate or for absorption in sorbing plastic base:

| | |
|---|---|
| Solvent for resin system | 500 to 1000 |
| Resin | 1 to 10 |
| Arylamine | 10 to 100 |
| Organic halogen compound | 0.5 to 50 |
| Inorganic halogen compound or inorganic halogenate compound or metallo-organic halide compound | [2] 1.0 to 50 |

[2] As 10% solution in own solvent. Figures given are dry weights.

The examples which follow are intended to further illustrate the invention and are not to be construed as limitative.

In each of the examples, the preparation of the photosensitive materials was accomplished under a red safelight and similar lighting conditions were utilized for coating of the various surfaces and for drying prior to exposure. The mixtures, unless otherwise stated, were prepared by adding each ingredient to the solvent first listed and allowing it to dissolve or to disperse therein, before adding the next succeeding ingredient.

*Example 1*

| | | |
|---|---|---|
| Acetone | cc | 100 |
| ½ second nitrocellulose | grams | 10 |
| Diphenylamine | do | 8 |
| Pentabromethane | do | 3 |
| Cadmium iodide (added as 10% solution in acetone) | grams | 3 |

The viscous solution obtained was spread on a soft glass base utilizing a doctor knife of 5 mil thickness yielding a finished and dry thickness of approximately one mil. After spreading, drying was accomplished by allowing the glass plate plus its attendant dope to stand in warm air at 40° C. until no further trace of solvent could be detected, after which it was placed in a light tight paper envelope.

A similar composition was prepared except that while all the other ingredients were maintained identically, the amount of nitrocellulose was reduced from 10 grams to 1 gram. In this particular case, the dope was spread on a glossy surface paper filled with barytes using a doctor knife of 3 mils and the added thickness to the paper after drying was equivalent to approximately 0.5 mil.

After thorough drying and again under a red safelight, samples of the glass plate and the paper coated material were inserted in a demountable cathode ray tube, emulsion side up on a faceplate, in which the faceplate was flat and whose surface represented the focus of the electron beams emerging from the cathode ray gun.

The beam current utilized was 20 microamperes, the accelerating potentials were 2 kilovolts, the beam energy was 127 watts per cm. sq.; the time on one spot diameter of such a beam was 2.7 microseconds; the minimum spot exposure was equivalent to $1.73 \times 10^{-3}$ joules per cm. sq., the peak to peak amplitude of the electron beam trace was 1.2 cm. and the beam diameter was 0.2 mm.

As a result of exposures of varying velocities of transverse movement of the electron beam by the transverse reflectance control, the maximum sine wave recorded on both the flat plate emulsion and on the paper was 400 cycles per second equivalent to a trace velocity of 1500 cm. per second.

The image obtained was blue in color and at a speed of 200 cycles per second or, in other words, at a maximum velocity half that of the maximum indicated in the preceding paragraph, a density, after suitable color correction, of 2.1 was achieved, this being about equivalent to the maximum density that could be obtained even on lengthy exposure with such a system.

*Example 2*

| | | |
|---|---|---|
| Benzene | cc | 100 |
| Polystyrene | grams | 10 |
| N-vinylcarbazole | do | 10 |
| Pentabromethane | do | 2 |
| Stannic iodide (added as 10% solution in 50:50 mixture of benzene and ethylene dichloride) | grams | 4 |

Two formulas in accordance with the foregoing were prepared. The first was as listed and in the second case the amount of polystyrene was reduced from 10 grams to 1 gram. Again these were deposited on glass and glossy baryta filled paper respectively and subjected to the identical conditions with respect to electron beam exposure as indicated in Example 1, except that after exposure the films were heated to 90° C. for 60 seconds and then cooled.

In these cases and for both surfaces, the maximum sine wave recorded was 2,000 cycles per second and the trace velocity as a consequence was equivalent to 7,500 cm. per second, this representing a minimum spot exposure of $3.45 \times 10^{-4}$ joules per cm. sq. The image color was brown black.

*Example 3*

| | | |
|---|---|---|
| Tetrahydrofuran | cc | 100 |
| N-vinylcarbazole | grams | 6 |
| Hexachlorethane | do | 5 |
| Polyvinylchloride (low molecular weight) | do | 10 |
| Cadmium iodide (as 10% solution in acetone) | grams | 4 |

The formula as represented in the foregoing was prepared and the dry film was spread on a cellulose acetate film of 7 mils thickness, said cellulose acetate film having been pigmented with titanium dioxide so as to be white and opaque. On drying, the film thickness was approximately 1.3 mils.

In this case, a high energy exposure was made with utilizing cathode ray tube electron beam exposure, in which case the accelerating potential was 20 kilovolts and the beam current was 30 microamperes. The spot diameter was 38 microns and the spot area was $10^{-5}$ cm. sq. equivalent to a beam energy density of $6 \times 10^4$ watts per sq. cm. Under these conditions, the available input band width was 2,000 megacycles and a writing speed of $3.5 \times 10^6$ cm. per second was detected, equivalent to an information storage rate of $10^9$ bits per second, these results being obtained as a result of the aforementioned exposure followed by 45 second heat treatment at 90° C.

Example 4

| | | |
|---|---|---|
| Benzene | cc | 100 |
| N-vinylcarbazole | grams | 10 |
| Carbon tetrabromide | do | 4 |
| Polystyrene | do | 10 |
| Triphenyl lead bromide (15% solution in benzene) | grams | 6 |

The formula as given immediately above was prepared and the dried film placed in a brown paper envelope.

While still retained in the brown paper envelope, the sample was placed emulsion side up on a flat base 12 inches from the target of an X-ray tube and half the film was covered with a lead plate 1/8 inch in thickness. Exposure was made for 5 seconds with this X-ray tube utilizing 50 kilovolts at approximately 15 microamperes. After removal from the envelope, the specimen was heated at 90° C. for 1/2 minute, after which the image developed out. The density achieved under such an exposure was equivalent to 2.4 indicating complete exposure within the time limits given for the exposure.

Example 5

| | | |
|---|---|---|
| Tetrahydrofuran | cc | 60 |
| Ethylene dichloride | cc | 30 |
| Ethylacetate | cc | 10 |
| N-vinylcarbazole | grams | 5 |
| Diphenylamine | do | 2 |
| Hexabromethane | do | 3 |
| Cellulose acetate | do | 10 |
| $PbI_2 \cdot 2KI$ (as 10% solution in 50:50 tetrahydrofuran and acetone) | grams | 4 |

The formula given in Example 5 was spread on titanium oxide pigmented cellulose acetate film. The exposure as indicated in Example 4 to X-rays was made in this case except that the voltage utilized was 60 kilovolts and the amperage at the filament was 20 milliamperes. A time of 5 seconds was again used. In this case, the film on removal from the envelope showed a blue image of density of the order of 0.8 to 1.0. This was then heated for one minute at 90° C. from which a brownish black image developed out, exhibiting a density of 2.6, indicating maximum exposure within the time limits and conditions given.

Example 6

| | | |
|---|---|---|
| Tetrahydrofuran | cc | 50 |
| Acetone | cc | 50 |
| Carbon tetrabromide | grams | 3 |
| N-vinylcarbazole | do | 5 |
| Polyvinylacetate | do | 10 |
| $HgI_2$ (10% solution in acetone) | do | 3 |

The coating formulation given in the foregoing was applied 7 mils wet on glass and dried down to 1.6 mils. It was exposed to 60 kilovolt X-rays at 10 milliamperes for 5 seconds and after heating at 90° C. for 30 seconds, a full density image was obtained of neutral gray color, exhibiting a density of 2.4.

Example 7

| | | |
|---|---|---|
| Benzene | cc | 100 |
| Polystyrene | grams | 10 |
| Diphenylamine | do | 10 |
| Carbon tetrabromide | do | 5 |
| Phenyl mercuric iodide (10% solution in benzene) | grams | 5 |

The coating formula given in Example 7 was placed on a soft glass backing at a wet thickness of 7 mils yielding a dried thickness of 1.1 mils and exposure at 60 kilovolts and 30 milliamperes at a distance of 12 inches was made covering 5 seconds of time. Immediately on removal from the paper, a completely developed deep blue image was available showing a density, after color correction, of 1.9, indicating the completeness of exposure.

Example 8

| | | |
|---|---|---|
| Tetrahydrofuran | cc | 50 |
| Acetone | cc | 50 |
| Polyvinylchloride (low molecular weight) | grams | 10 |
| N-vinylcarbazole | do | 10 |
| Pentabromethane | do | 4 |
| $PbBrO_3 \cdot 2KBr$ (10% solution in 50:50 methyl alcohol:acetone) | grams | 4 |

The composition in accordance with the above was coated on titanium dioxide filled cellulose acetate base film at a coating thickness of 5 mils which after drying exhibited a dried thickness of roughly 0.8 mil. This was exposed to 50 kilovolts at 10 milliamperes for 5 seconds. A very faint image was available on removal from the light tight envelope, and after heating at 90° C. for 45 seconds, a blue-black image exhibiting a density of 2.4 was obtained, indicating a visualization close to maximum exposure.

The same material was then given in exposure in the electron beam equipment, utilizing the 2 kilovolt, 20 microampere electron gun device. A faint greenish image was just visible at 2,000 cycles per second equivalent to a trace velocity of 7,500 cm. per second, and on heat development at 90° C. for 45 seconds, this faint greenish image transformed to a brownish black image of density equivalent to roughly 2.4, indicating that the speed of this system for this type of exposure was substantially higher than the conditions given for the example.

Example 9

| | | |
|---|---|---|
| Acetone | cc | 50 |
| Methylalcohol | cc | 20 |
| Tetrahydrofuran | cc | 30 |
| Nitrocellulose | grams | 10 |
| N-vinylcarbazole | do | 1 |
| Diphenylamine | do | 4 |
| Carbon tetrabromide | do | 4 |
| Mercuric bromide (10% solution in 50:50 tetrahydrofuran:acetone) | grams | 2 |

The formula as given in the foregoing was spread on the glossy baryta filled paper as before, utilizing a wet film thickness of 8 mils, yielding a dry thickness on the paper of approximately 1.7 mils. After drying and under red light conditions, two types of spark exposures were made. In the first case, a 500 micromicrofarad capacitor was charged to 5 kilovolts. The paper was then placed emulsion side up on a copper plate. One electrode from the spark discharge equipment was placed roughly 1/8 inch from the paper and within one mil of the surface, and the second electrode was connected to the base plate. On discharge of the condenser, a spark travelled from the electrode above the emulsion to the copper base plate, thus yielding approximately 1/2 inch of live spark travel, the entire exposure requiring a fraction of a microsecond. The path of the spark was immediately duplicated in a brown black color which was deepened substantially on heating.

In a second group of exposures, the same surface was submitted to a more highly condensed spark and effectively in contact with the paper so that for all practical purposes it may be considered smothered, and in which the breakdown of the paper was such as to permit leakage to take place directly through the paper with a conducting backing. No visible light could be seen in ordinary room light under these conditions. The paper was removed under the sparking stylus at varying rates of speed, and under relatively crude conditions, it was established that speeds of a range of approximately 1,000 feet per second could be recorded by such paper particularly if heated after exposure.

Example 10

The foregoing composition was utilized in the same manner as described in Example 1.

In the foregoing description, the energy to which the compositions described have been subjected comprises electromagnetic radiation as hereinbefore defined including radiation such as X-rays and other short wavelength energy and corpuscular energy. The term "corpuscular" is intended to cover pulsed energy in the form of ions and electrons and is not intended to include cosmic rays or radio waves.

The organic halogen-containing free radical sources preferred in the practice of the present invention may be represented by the general formula B—C—$X_3$, wherein B stands for a monovalent alkyl nucleus, an aryl nucleus such as phenyl; hydrogen, halogen other than fluorine; haloalkyl, or substituted aryl; and each X is a halogen selected from the group consisting of chlorine, bromine and iodine.

Having now described my invention in accordance with the patent statutes, we claim:

1. A photosensitive mixture comprising:
   (1) carrier material selected from the group consisting of film forming polymers of vinylidene monomers and film forming cellulose compounds;
   (2) organic amine selected from the group consisting of (a) arylamines represented by the general formula

wherein R is an aromatic nucleus and each of X and Y is selected from the group consisting of H, Cl, Br, I, alkyl, and aryl and (b) N-vinyl amines;
   (3) organic halogen containing compound having a bond dissociation energy between about 40 and 80 kilogram calories per mole and represented by the general formula A—C—$Z_3$ wherein A is selected from the group consisting of H, Cl, Br, I, unsubstituted alkyl, chloroalkyl, bromoalkyl and aryl; and Z is a halogen selected from the group consisting of Cl, Br and I;
   and (4) a constituent which imparts to the foregoing composition an otherwise absent sensitivity to X-radiation, gamma rays, electron beams, beta rays, condensed spark discharges and other forms of corpuscular energy, namely heavy metal containing halogen compound selected from the group consisting of iodides, iodates, bromides, bromates and metalloorganic iodine and bromine compounds of a metal selected from the group consisting of cadmium, tin, antimony, mercury, lead, bismuth and each of said metals being present in said compounds in its higher valence state;
   there being present in said composition from 1 to 50 parts by weight of said heavy metal containing halogen compound, from 0.5 to 50 parts by weight of said organic halogen containing compound and from 10 to 100 parts by weight of said organic amine, and up to 100 parts by weight of said film forming carrier in said composition.

2. The composition of claim 1 wherein said amine is diphenylamine.

3. The composition of claim 1 wherein said amine is N-vinylcarbazole.

4. The composition of claim 1 wherein said organic halogen containing compound is a halogen substituted methane.

5. The composition of claim 1 wherein said organic halogen containing compound is a halogen substituted ethane.

6. A composition according to claim 1 as a dope dissolved in a plurality of organic solvents.

7. The composition of claim 6 wherein for each 500 to 1000 parts by weight of said solvent the composition includes about 100 parts by weight of carrier material; from 10 to 100 parts by weight of said organic amine; between about 0.5 and 50 parts by weight of said organic halogen compound and between 1 and 50 parts by weight of said heavy metal containing halogen compound.

8. The composition of claim 6 wherein for each 500 to 1000 parts by weight of solvent the composition includes about 1 to 10 parts by weight of said carrier material; from 10 to 100 parts by weight of said organic amine; between about 0.5 and 50 parts by weight of said organic compound and a total of from about 1 to 50 parts by weight of said heavy metal containing halogen compound.

9. The product formed by elimination of the solvent from a thin film comprising the composition of claim 6.

10. The product of claim 9 as a self-supporting film.

11. A photographic article comprising the product of claim 9 as a film supported on a non-sorbent base.

12. The photographic article of claim 11 wherein the base is glass.

13. A photographic article comprising the product of claim 9 supported on a base of sorbent organic material.

14. A process for producing a visible image which comprises:
   preparing the composition of claim 1 with a support therefor; and
   exposing the said composition to a pattern of non-visible electromagnetic radiation.

15. The process of claim 14 wherein the exposure is to X-radiation.

16. A process for producing a visible image which comprises:
   preparing the composition of claim 1 with a support therefor; and
   exposing the said composition to corpuscular energy.

References Cited in the file of this patent

UNITED STATES PATENTS

| | | |
|---|---|---|
| 702,554 | Henriot | June 17, 1902 |
| 1,574,359 | Beebe et al. | Feb. 23, 1926 |
| 1,604,674 | Beebe et al. | Oct. 26, 1926 |
| 2,072,302 | Hermann et al. | Mar. 2, 1937 |
| 2,072,465 | Reppe et al. | Mar. 2, 1937 |
| 2,276,840 | Hanford et al. | Mar. 17, 1942 |
| 2,728,664 | Carroll et al. | Dec. 27, 1955 |
| 2,816,029 | Jones | Dec. 10, 1957 |
| 2,843,490 | Jones | July 15, 1958 |
| 3,042,515 | Wainer | July 3, 1962 |
| 3,042,517 | Wainer | July 3, 1962 |
| 3,042,518 | Wainer | July 3, 1962 |

FOREIGN PATENTS

| | | |
|---|---|---|
| 786,924 | Great Britain | Nov. 27, 1957 |